(12) United States Patent
Peterson

(10) Patent No.: US 7,625,108 B1
(45) Date of Patent: Dec. 1, 2009

(54) BIKE LIGHT

(76) Inventor: Gary Peterson, 943 Sparrow Hawk Dr., Longmount, CO (US) 80501

( * ) Notice: Subject to any disclaimer, the term of this patent is extended or adjusted under 35 U.S.C. 154(b) by 207 days.

(21) Appl. No.: 10/691,591

(22) Filed: Oct. 24, 2003

Related U.S. Application Data

(60) Provisional application No. 60/420,781, filed on Oct. 24, 2002.

(51) Int. Cl.
*B62J 6/00* (2006.01)
(52) U.S. Cl. .......... 362/473; 362/84; 362/161; 362/368; 362/500; 362/800
(58) Field of Classification Search .......... 362/473, 362/500, 84, 249, 800, 457, 545, 543–544, 362/549, 276, 802, 190, 191, 368; 250/462.1, 250/463.1; 252/301.36
See application file for complete search history.

(56) References Cited

U.S. PATENT DOCUMENTS

| | | | | |
|---|---|---|---|---|
| 4,796,972 | A * | 1/1989 | Thomas et al. | 359/523 |
| 5,283,547 | A * | 2/1994 | Leon | 340/432 |
| 5,624,175 | A | 4/1997 | Geiormino et al. | |
| 5,653,523 | A * | 8/1997 | Roberts | 362/500 |
| 5,800,039 | A * | 9/1998 | Lee | 362/473 |
| 5,803,574 | A | 9/1998 | Szaniszio | |
| 5,839,814 | A * | 11/1998 | Roberts | 362/545 |
| 5,951,150 | A * | 9/1999 | Helstern | 362/293 |
| 5,984,487 | A * | 11/1999 | McGhee | 362/507 |
| 6,016,101 | A * | 1/2000 | Brown | 340/432 |
| 6,059,431 | A | 5/2000 | Ellis, Jr. | |
| 6,072,386 | A * | 6/2000 | Yu | 340/432 |
| 6,170,968 | B1 | 1/2001 | Caswell | |
| 6,186,635 | B1 | 2/2001 | Peterson et al. | |
| 6,501,199 | B2 * | 12/2002 | Hung | 310/67 A |

OTHER PUBLICATIONS

Article entitled: "In the Dark: Seeing Bikes at Night", by DeValois, Karen, et al.. "Access", No. 20, Spring 2002, pp. 14-19.

* cited by examiner

*Primary Examiner*—Jacob Y Choi
*Assistant Examiner*—Leah S Lovell
(74) *Attorney, Agent, or Firm*—Rick Martin; Patent Law Office of Rick Martin, P.C.

(57) ABSTRACT

A light which is attached to at least a pair of spokes on a bike wheel by a clip which snaps onto a housing to trap the spokes therebetween.

6 Claims, 2 Drawing Sheets

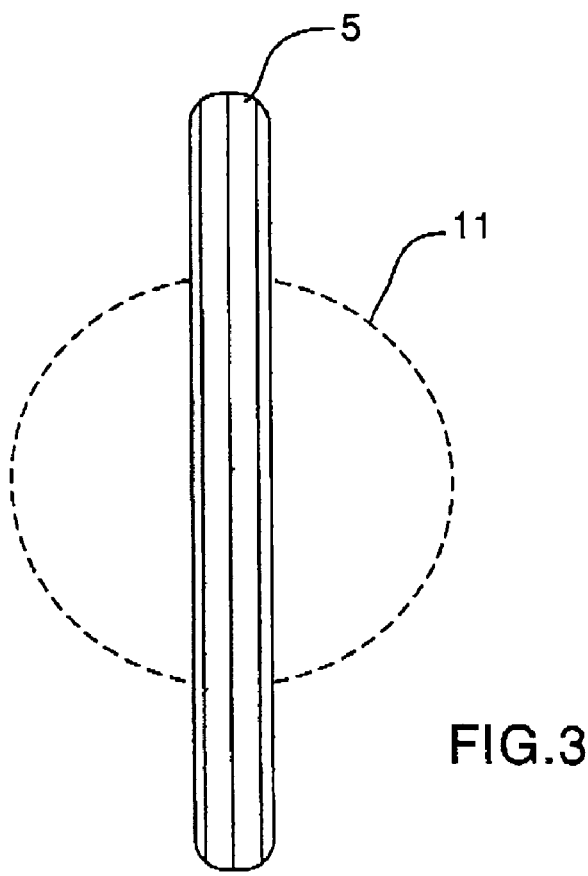
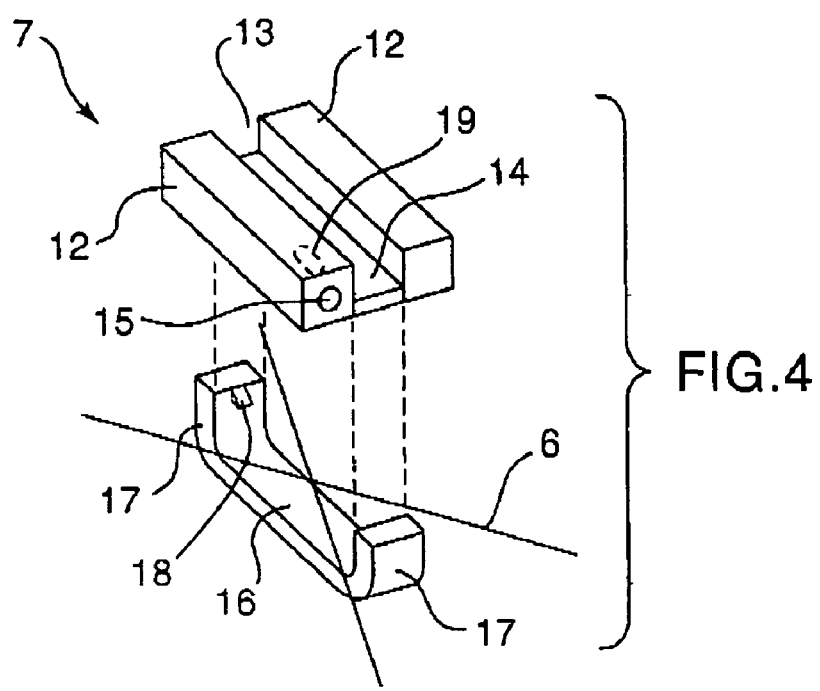

BIKE LIGHT

Applicant claims priority of Provisional application Ser. No. 60/420,781, Filed Oct. 24, 2002.

BACKGROUND OF THE INVENTION

This invention relates, in general, to lights, and, in particular, to lights which are attached to bike wheels.

DESCRIPTION OF THE PRIOR ART

In the prior art various types of devices have been proposed. For example, U.S. Pat. No. 6,170,968 to Caswell discloses a light attached to the spokes of a bike by means of a threaded fastener.

U.S. Pat. No. 5,803,574 to Szaniszio discloses a light attached to the spokes of a bike by means of a threaded fastener.

U.S. Pat. No. 5,624,175 to Geiormino et al discloses a light attached to the spokes of a bike by means of a spring clip.

U.S. Pat. No. 6,059,431 to Ellis, Jr. discloses a light attached to the spokes of a bike and which has a pair of containers for the batteries that extend at right angles to each other.

U.S. Pat. No. 6,186,635 to Peterson et al discloses a device attached to a bike and made from a material comprising a mixture of PVC, phosphorescent, brightener and fluorescent color that produces visible light emissions.

There is a need for reducing or eliminating the high number of accidents and deaths caused by the lack of adequate illumination at night or during other low visibility conditions. Low visibility safety issues apply to a variety of "at risk" situations that include fire and police patrol officers, highway workers, search and rescue teams, bicyclists and pedestrians. Bicycling is an increasing popular recreational activity that people of all walks of life enjoy. However, bicycling is also potentially dangerous, especially at night, when the bicyclist is less visible to automobile drivers and pedestrians.

To address this problem, bicyclist typically equip their vehicles with one or more of the following: a directional lighting device, visible either from the front or the back; using reflective devices on their bike or clothing. However, these devices offer a limited degree of visibility and therefore provide a less than adequate measure of safety.

The devices of the prior art are undesirable as safety equipment since they are relatively expensive, and they do not provide illumination in excess of 1000 feet, and/or in a direction exceeding 180 degrees from the light source.

SUMMARY OF THE INVENTION

The present invention is directed to a light which is attached to at least a pair of spokes on a bike wheel by a clip which snaps onto a housing to trap the spokes therebetween.

It is an object of the present invention to provide a new and improved light for bikes.

It is an object of the present invention to provide a new and improved light for bikes that is easy and quickly applied to a bike wheel.

It is an object of the present invention to provide a new and improved light for bikes that will provide a measure of safety to the user at night or in reduced visibility.

It is an object of the present invention to provide a new and improved light for bikes that will increase the visible distance and the effective angle (degree) of visibility for bicyclists and others "at risk" at night and/or during other low visibility conditions.

It is an object of the present invention to provide a new and improved light for bikes that provides a dual source of illumination.

These and other objects and advantages of the present invention will be fully apparent from the following description, when taken in connection with the annexed drawings.

BRIEF DESCRIPTION OF THE DRAWINGS

FIG. 3 is a view of the present invention showing the illumination area from the top.

FIG. 4 is an exploded view of a housing for the light and the clip of the present invention before they are attached to the spokes of a bike.

DESCRIPTION OF THE PREFERRED EMBODIMENT

Figure 1:
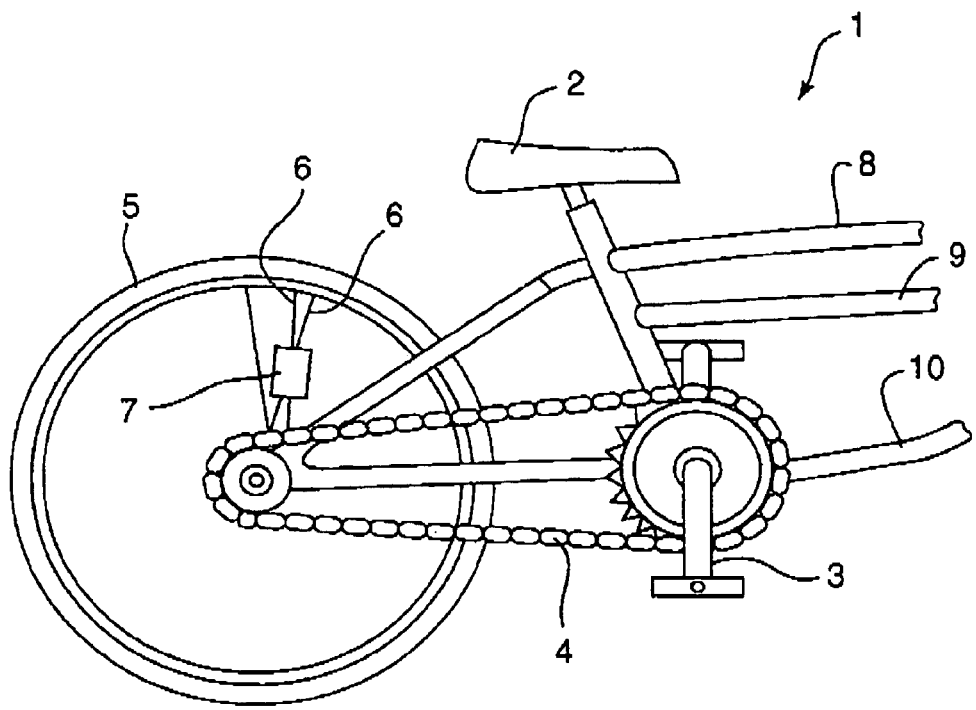
FIG. 1 is a side view of the present inventions secured to the wheel of a bike.

Referring now to the drawings in greater detail, FIG. 1 shows the present invention 1 attached to the rear wheel 5 of a conventional bike. The bike has the conventional elements such as frame members 8, 9, 10, pedals 3, chain 4, seat 2 and spokes 6 (only some of which are shown in FIG. 1, for clarity). It should be noted that the bike shown in FIG. 1 is a conventional bike, and is not part of the present invention 1. Also, while the light block 7 is shown attached to the rear wheel of the bike, it is not the only place it can be attached. It could be attached instead, or in addition, to the front wheel of the bike.

Figure 2:
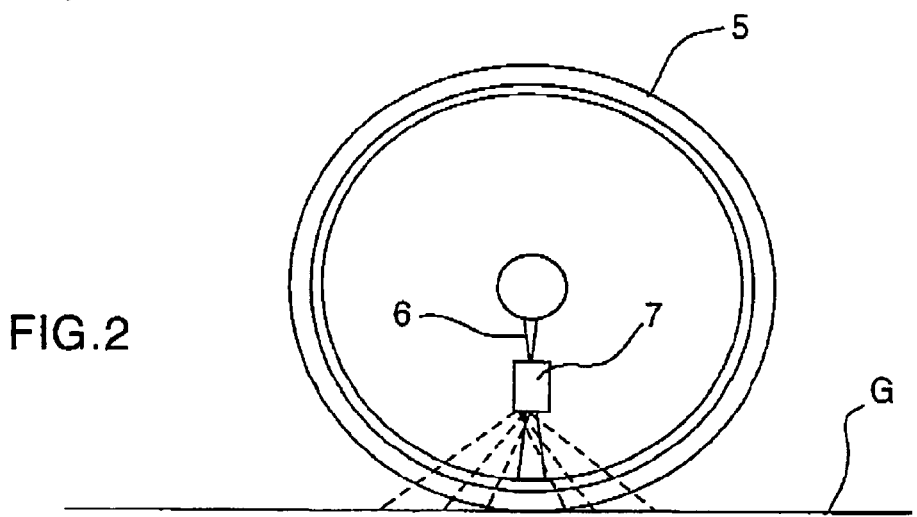
FIG. 2 is a side view of the present invention showing the illumination area from the side.

As shown in FIG. 2, the light block 7 is attached to the spokes 6 such that the light block 7 is mounted in a plane substantially parallel to the plane of the wheel. Since this light block 7 is attached to the spokes 6, the light block 7 will rotate as the wheel 5 rotates. Therefore, the light emanating from the light block 7 (as shown by the dotted lines in FIG. 2) will change direction as the wheel rotates. That is when the light block 7 is near the bottom of the rotation, the light will illuminate the ground G. As the wheel 5 continues to rotate and the light block 7 is at the rear of the wheel, the light will show toward the back of the bike. As the wheel 5 continues to rotate and the light block 7 is at the front of the wheel, the light will show toward the front of the bike. This will provide a light stream providing a complete 360 degrees of visibility as the bike is moving, enabling the bicyclists to be seen from any direction.

FIG. 3 shows the light pattern (the dotted line circle 11) which the rotating wheel 5 will produce when seen from above the bike. The pattern is produced by the wide angle lens 15 used with the LED 19 mounted in the light block 7 (see also FIG. 4).

FIG. 4 shows the light block 7 before it is attached to the spokes 6 of a bike wheel. The light block 7 is made from the same material as the device of U.S. Pat. No. 6,186,635 which is incorporated herein by reference. The light block 7 has a pair of side portions 12 which form a groove 13 therebetween. A floor 14 is positioned at the bottom of the groove 13 and is either unitary with or integral with the side portions 12. At least one end of the block 7 has a lens 15 which covers an LED 19 mounted within the width of the light block 7. The lens 15 protrudes from the block 7 substantially parallel to the plane of the wheel. In addition, the light block 7 has a conventional power source (preferably two 3-volt lithium batteries, although other power sources can be used without departing from the scope of the invention). Also, the light block 7 has a conventional on/off switch (not shown) which will connect or disconnect the batteries with the LED 19. Since the LED, batteries and switch are conventional items, further description is not necessary and will not be given.

Since the LED 19 is mounted within the block 7 it will activate the material of the block which in turn will produce light, as described in U.S. Pat. No. 6,186,635. The LED also eliminates the need for an external activation source for the block. Therefore, the LED produces its own light and activates the material of the block 7, thereby providing two sources of light. It should be noted that while only one LED is shown, additional LED's could be used if necessary or desirable. The material used for the block 7 is a compound comprising a ration of six parts of phosphorescent brightener and four parts of fluorescent coloring and four drops of mineral oil to 100 parts of polyvinylchloride, as disclosed in U.S. Pat. No. 6,186,635.

In order to secure the block 7 to the spokes 6, a clip, as shown in FIG. 4 is used. The clip is U-shaped and has ends 17 and a base 16. Each of the ends 17 has a wedge shaped retaining member 18 on an inside surface. In order to mount the block 7, the block would be positioned on one side of two spokes 6, where the spokes cross. The clip would be positioned on the other side of the same spokes. Then the clip, which is at least partially resilient, will be snapped onto the block. The ends 17 engage the block in the area of the groove 13 and the retaining members 18 snap onto the floor 14 to secure the block to the spokes. Since the ends 17 are positioned on opposite sides of the crossing point of the spokes, there will be little or no movement of the block along the length of the spokes, thereby, providing a secure engagement between the block, the clip and the spokes.

Although the Bike Light and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A safety light for a wheel of a bike, the wheel having spokes which extend from a central hub to a wheel, the safety light comprising:
   a light block having a battery, a switch and an LED light;
   said LED light mounted at a light end of the light block in conjunction with a wide angle lens;
   a mounting means for the light block to secure the light block to a spoke with the light end facing toward the wheel;
   wherein a light pattern emanating from the light end thru the wide angle lens will change direction as the wheel rotates providing a light stream of a complete 360° of visibility as the bike is moving, enabling the bike to be seen from all sides from an observer's perspective, and when the light end is near a bottom of rotation, the light pattern will illuminate the ground, as the wheel continues to rotate the light pattern will show towards a rear of the bike, and as the wheel continues to rotate the light pattern will show toward a front of the bike; the light end being visible through the spokes from the left and the right side of the bike; and
   wherein the light pattern enables the bike to be seen from any direction, and wherein an exterior of the light block further comprises a phosphorescent brightener functioning to provide a separate light source rotating in a cycloid pattern.

2. The apparatus of claim 1, wherein the mounting means further comprises a groove in the light block and a clip.

3. A safety light for a wheel of a bike, the wheel having spokes which extend from a central hub to a wheel, the safety light comprising:
   a light block having a light and a power source; said light mounted at a light end of the light block in conjunction with a wide angle lens;
   a mounting means for the light block to secure the light block to a spoke with the light end facing toward the wheel;
   wherein a light pattern emanating from the light end thru the wide angle lens will change direction as the wheel rotates providing a light stream of a complete 360° of visibility as the bike is moving, enabling the bike to be seen from all sides from an observer's perspective, and when the light end is near a bottom of rotation, the light pattern will illuminate the ground, as the wheel continues to rotate the light pattern will show towards a rear of the bike, and as the wheel continues to rotate the light pattern will show toward a front of the bike; the light end being visible through the spokes from the left and the right side of the bike; and
   the light end being visible through the spokes from the left and the right side of the bike,
   wherein an exterior of the light block further comprises a phosphorescent brightener functioning to provide a separate light source rotating in a cycloid pattern.

4. The apparatus of claim 3, wherein the mounting means further comprises a groove in the light block and a clip.

5. A safety light for a wheel of a bike, the wheel having spokes which extend from a central hub to a wheel, the safety light comprising:
   a light block having a light and a power source;
   said light mounted at a light end of the light block;
   a mounting means for the light block to secure the light block to a spoke with the light end facing toward the wheel and away from the hub;
   wherein a light pattern emanating from the light end thru the wide angle lens will change direction as the wheel rotates providing a light stream of a complete 360° of visibility as the bike is moving, enabling the bike to be seen from all sides from an observer's perspective, and when the light end is near a bottom of rotation, the light pattern will illuminate the ground, as the wheel continues to rotate the light pattern will show towards a rear of the bike, and as the wheel continues to rotate the light pattern will show toward a front of the bike; the light end being visible through the spokes from the left and the right side of the bike; and
   the light end being visible through the spokes from the left and the right side of the bike creating a cycloid pattern visible from the left and the right side of the bike,
   wherein an exterior of the light block further comprises a phosphorescent brightener functioning to provide a separate light source rotating in a cycloid pattern.

6. The apparatus of claim 5, wherein the mounting means further comprises a groove in the light block and a clip.

* * * * *